United States Patent Office 3,219,711
Patented Nov. 23, 1965

3,219,711
PREPARATION OF CHLOROVINYL AROMATIC COMPOUNDS
Walter L. Borkowski, Media, and John J. van Venrooy, Wyncroft, Pa., assignors to Sun Oil Company, Philadelphia, Pa., a corporation of New Jersey
No Drawing. Filed Nov. 19, 1962, Ser. No. 238,759
8 Claims. (Cl. 260—651)

This invention relates to a process for preparing chlorovinyl aromatic compounds by reacting alkaryl compounds with ferric chloride at high temperatures. By way of example, ethylbenzene is reacted with ferric chloride at a temperature above 250° C. to produce chlorovinyl benzenes in which the vinyl group has from one to three chlorine atoms substituted for hydrogen atoms.

According to the invention, alkaryl compounds of a class hereinafter defined and which may or may not contain chlorine or fluorine atoms attached to the aromatic nucleus are reacted with ferric chloride at a temperature in the range of 250–500° C., more preferably 315–425° C. Reaction of the charge compound with the ferric chloride proceeds mainly at the alkyl substituent portion of the molecule, resulting in the formation of a chlorovinyl group which contains one or more chlorine atoms. The depth of chlorination effected depends upon the reaction conditions used. Little or no chlorination of the aromatic nucleus occurs. From the reaction mixture one or more chlorovinyl aromatic products can be separated. These products are useful for making polymers and copolymers and as intermediates in the preparation of perfumes, drugs and dyes.

The reaction of ethylbenzene with ferric chloride at moderate temperatures has been investigated and reported by Kovacic et al., in J.A.C.S., vol. 82, pages 1917–1923 (1960). These investigators found that several types of reaction occurred. The main reaction was a dimerization that resulted in the formation of $C_{16}$ dicyclic benzenoid hydrocarbons. Smaller amounts of trimer and higher polymers also were formed. Another type of reaction that occurred was disproportionation whereby benzene and diethylbenzene were formed. Still another type of reaction involved chlorination of the benzene ring. No chlorinated products in which the chlorine was present in the alkyl substituent group were obtained.

We have now found that reaction between ferric chloride and ethylbenzene or other alkaryl compounds can be made to occur in a manner almost entirely different from that previously observed. This is done by contacting the alkaryl compound with ferric chloride at a considerably higher temperature, namely, in the range of 250–500° C. and preferably in the range of 315–425° C. with the ferric chloride preferably being in vapor form. The mechanism by which the chlorination of the alkyl substituent is thought to proceed through the stages that result in mono-, di- and trichlorination of the vinyl group is depicted in the following equations in which A represents the aryl nucleus:

(1) $ACH_2CH_3 + Fe_2Cl_6 \longrightarrow ACH_2CH_2Cl + HCl + 2FeCl_2$ (2) $ACH_2CH_2Cl \xrightarrow[FeCl_2]{Fe_2Cl_6} ACH=CH_2 + HCl$ (3) $ACH=CH_2 + Fe_2Cl_6 \longrightarrow ACHClCH_2Cl + 2FeCl_2$ (4) $ACHClCH_2Cl \xrightarrow[FeCl_2]{Fe_2Cl_6} ACH=CHCl + HCl$ (5) $ACH=CHCl + Fe_2Cl_6 \longrightarrow ACHCl-CHCl_2 + 2FeCl_2$ (6) $ACHCl-CHCl_2 \xrightarrow[FeCl_2]{Fe_2Cl_6} ACH=CCl_2 + HCl$ (7) $ACH=CCl_2 + Fe_2Cl_6 \longrightarrow ACHCl-CCl_3 + 2FeCl_2$ (8) $ACHCl-CCl_3 \xrightarrow[FeCl_2]{Fe_2Cl_6} ACCl=CCl_2 + HCl$ From the foregoing equations it can be seen that the reaction mechanism involves alternate stages of chlorination and dehydrochlorination in which ferric chloride is a reactant in the chlorination stages while ferric chloride and/or ferrous chloride function as a catalyst during the dehydrochlorination stages. Separate processing steps are not required to effect the successive reactions and all of them can be made to occur in a single processing step. The processing conditions can be varied to maximize the yield of any particular chlorovinyl compound shown in the equations that happens to be the desired product. Thus β-chlorovinylbenzene (Equation 4) or β,β-dichlorovyinylbenzene (Equation 6) or trichlorovinylbenzene (Equation 8) can be produced in maximized yield by appropriate adjustment of reaction conditions. However, the saturated chlorohydrocarbons shown as products of Equations 1, 3, 5 and 7 cannot be produced by the process in any substantial yield for the reason that the dehydrochlorination reactions occur so rapidly that these compounds are merely transitory intermediates.

The reaction conditions which influence the depth of chlorination attained are mainly the mole ratio of ferric chloride to alkaryl compound charged and the contact time. An increase of either the ratio or the time tends to result in deeper chlorination. The reaction temperature has little if any effect within the specified temperature range. The process is operated at mole ratios of $FeCl_3$:alkaryl generally in the range of 0.1:1 to 50:1 and more usually 0.5:1 to 10:1, and with residence times ranging from one second to one hour and more typically 5–500 seconds.

The alkaryl compounds which can be reacted according to the present invention consist of alkaryl hydrocarbons and their chlorine or fluorine derivatives in which one or more chlorine or fluorine atoms appear as substituents on the aryl nucleus. These compounds can have from one to three saturated hydrocarbon groups attached to the nucleus. Each of such groups should have no more than three carbon atoms and at least one of the groups should have 2–3 carbon atoms. In other words one or two of the hydrocarbon substituents can be methyl groups but at least one of the other groups must include two adjacent carbon atoms which can become a vinyl group during the reaction. The positions on the aromatic nucleus other than those at which the saturated hydrocarbon groups are attached can be partially or completely substituted by chlorine or fluorine, in which case the same stepwise reactions of chlorination and dehydrochlorination will occur for the saturated hydrocarbon substituents as occurs in the case of the corresponding alkaryl hydrocarbons. The aryl group in the charge compound can be a benzene ring or a naphthalene nucleus.

In addition to ethylbenzene shown by way of example in the equations listed above, other examples of alkaryl compounds that can be used in the present process are as follows: n-propylbenzene; cumene; methylethylbenzenes; diethylbenzenes; dimethylethylbenzenes; dimethylpropylbenzenes; triethylbenzenes; diethylisopropylbenzenes; tripropylbenzenes; indane; methylindanes; dimethylindanes; ethylindane; ethylnaphthalenes; methylethylnaphthalenes; diethylnaphthalenes; methylpropylnaphthalenes; acenaphthene; methylacenaphthenes; ethylacenaphthenes; and halogenated derivatives of such hydrocarbons in which one or more chlorine and/or fluorine atoms are attached to the aromatic nucleus. All of the foregoing compounds are characterized by the presence on the aromatic nucleus of at least one saturated hydrocarbon substituent having 2–3 carbon atoms and not more than three saturated hydrocarbon groups each having 1–3 carbon atoms.

As illustrated in the equations above, an ethyl group in the charge alkaryl compound can be made to undergo three stages of chlorination in which the resulting vinyl group has one, two or three chlorine atoms. With either one or two chlorine atoms incorporated in the group, substantially no chlorine appears at the alpha position. In the case of an n-propyl or isopropyl group attached to the aromatic nucleus, it is possible to effect a degree of chlorination whereby up to five chlorine atoms are incorporated in the resulting unsaturated substituent group. This requires a high mole ratio of ferric chloride to charge alkaryl compound and relatively long contact time in the reaction zone.

As previously indicated, the reaction is carried out at a temperature above 250° C., and for most of the alkaryl compounds named above, preferably above 315° C. with the ferric chloride in vapor form. However, for alkaryl compounds which have the indane structure, it is usually preferable to operate at a temperature near the lower end of the specified range, as otherwise coking difficulties may be encountered.

One manner of carrying out the process comprises vaporizing the ferric chloride and feeding it and the heated alkaryl compound into a reactor in which the temperature is maintained in the range of 315–425° C. The alkaryl and ferric chloride react rapidly in the manner shown in the equations and solid ferrous chloride precipitates to the bottom of the reactor from which it can be transferred to another reactor for conversion to the ferric form by reaction with chlorine or with hydrogen chloride and oxygen. Preferably the hydrogen chloride obtained as a by-poduct of the reactions illustrated in the equations above is used together with make-up hydrogen chloride and added oxygen for converting the ferrous chloride back to the ferric form for reuse. The molar ratio of ferric chloride to alkaryl compound fed to the first reactor can vary widely as previously indicated. Any excess of ferric chloride will pass out of the reactor along with the reaction product and can be separated therefrom by condensation. The use of relatively low ratios of ferric chloride to alkaryl compound tends to result in a low level of chlorination of the substituent portion of the alkaryl compound while the use of high ferric chloride to alkaryl ratios tends to promote the formation of the more highly chlorinated vinyl aromatic products. As a general rule, a portion of the alkaryl charge passes through the reactor without being chlorinated. The unreacted material can be recovered from the reaction product and recycled to the reactor for further conversion.

The following examples illustrate the invention under chlorination conditions which are relatively mild for the particular alkaryl compounds used.

EXAMPLES I–III

A series of runs was made in which ethylbenzene was contacted with $Fe_2Cl_6$ in vapor form in a tubular reactor under the reaction conditions listed in the accompanying table. The technique of feeding the ferric chloride into the reactor comprised maintaining a bed of the ferric chloride at 275–310° C. in a tube connected to the reactor and passing helium as a carrier gas through the bed and into the top of the reactor. A stream of ethylbenzene was admixed with a stream of helium heated to about 100° C. and the mixture was introduced into the reactor. The reactor was electrically heated to maintain the desired reaction temperature. In each run 6 liters of inert gas were used for carrying the $Fe_2Cl_6$ and 4 liters of inert gas were fed to the reactor admixed with ethylbenzene, the proportion of the latter to the ferric chloride being varied from run to run. The reaction product containing solid ferrous chloride passed from the bottom of the reactor into a trap wherein the $FeCl_2$ and any unreacted $Fe_2Cl_6$ were separated. Identification of the products produced in the reaction was done by vapor phase chromatography, nuclear magnetic resonance and infrared spectra. Conditions and results for three runs made in this manner are shown in Table I.

Table I

| | Run No. 1 | Run No. 2 | Run No. 3 |
|---|---|---|---|
| Reactor temperature, ° C. | 304 | 325 | 350 |
| Residence time, seconds | 34 | 27 | 31 |
| $FeCl_3$ : ethylbenzene mole ratio | 1.83 | 0.32 | 2.20 |
| Ethylbenzene converted, percent | 37.3 | 8.6 | 51.9 |
| Production composition: | | | |
| $C_6H_5CH=CH_2$ | | | 3.4 |
| $C_6H_4ClC_2H_5$ | Trace | 0.5 | Trace |
| $C_6H_5CH=CHCl$ | 20.3 | 6.9 | 30.9 |
| $C_6H_5CH=CCl_2$ | 16.8 | 1.2 | 14.5 |
| Other | 0.16 | Trace | 3.1 |

The tabulated data show that β-chlorostyrene and β,β-dichlorostyrene were the major products produced under the reaction conditions used. In all of the runs the β-chlorostyrene was a mixture of the trans and cis isomers in a trans: cis ratio of about 1.5:1. Only a negligible amount of chlorination of the benzene nucleus occurred, and the small amount of ethylchlorobenzene resulting therefrom was a mixture of ortho and para isomers. Only in Run No. 3 made at the highest temperature used in the series did any identifiable non-chlorinated derivative (styrene) appear in the product. Besides the products listed in the table, trace amounts of non-identified higher molecular weight solid products condensed in the reactor outlet tube.

EXAMPLE IV

Another run was made in which the alkaryl compound used was p-chloroethylbenzene. The procedure used was essentially the same as in the preceding runs except that in this case the stream of helium into which the p-chloroethylbenzene was fed was heated to about 150° C. Conditions and results of this run are shown in Table II.

Table II

Reactor temperature, ° C. _____ 315
Residence time, seconds _____ 33
$FeCl_3$:p-chloroethylbenzene mole ratio _____ 1.40
P-chloroethylbenzene converted, percent _____ 36.9
Product composition:

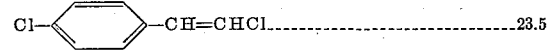23.5

13.4

Other _____ trace

Essentially no p-chlorostyrene was produced in the reaction. The monochlorovinyl compound formed as the major product of the reaction was a mixture of the trans and cis isomers in a trans:cis ratio of 1.47:1. These results show that chlorovinylchlorobenzenes can be formed from ethylchlorobenzene in the same way that chlorovinylbenzenes are producible from ethylbenzene.

When it is desired to obtain more highly chlorinated vinyl aromatic products, considerably higher $FeCl_3$:alkaryl compound ratios and longer residence times than were used in the foregoing runs should be employed. When other alkaryl compounds as herein specified are substituted for ethylbenzene or p-chloroethylbenzene, analogous reactions are obtained in the present process.

We claim:
1. Method for preparing chlorovinyl aromatic compounds which comprises contacting ferric chloride at a temperature in the range of 250–500° C. with an alkaryl compound selected from the group consisting of (1) alkaryl hydrocarbons having an aryl nucleus selected from the group consisting of benzene and naphthalene nuclei and having attached thereto 1–3 alkyl groups each of which has not more than three carbon atoms and at least one of which has 2–3 carbon atoms and (2) halogenated alkaryls in which the hydrocarbon portion corresponds to the alkaryl hydrocarbons specified above and which have at least one halogen atom selected from the group consisting of chlorine and fluorine attached to the aryl nucleus the ratio of ferric chloride to said alkaryl compound being in the range of 0.1:1 to 50:1.

2. Method according to claim 1 wherein the temperature is in the range of 315–425° C.

3. Method according to claim 1 wherein said alkaryl compound is a monoalkylbenzene in which the alkyl group has 2–3 carbon atoms.

4. Method according to claim 3 wherein the temperature is in the range of 315–425° C.

5. Method for preparing chlorovinylbenzene which comprises contacting ferric chloride at a temperature in the range of 250–500° C. with ethylbenzene, the ratio of ferric chloride to ethylbenzene being in the range of 0.5:1 to 10:1.

6. Method according to claim 5 wherein the temperature is in the range of 315–425° C.

7. Method for preparing chlorovinylbenzene which comprises contacting ferric chloride at a temperature in the range of 250–500° C. wth ethylchlorobenzene, the ratio of ferric chloride to ethylchlorobenzene being in the range of 0.5:1 to 10:1.

8. Method according to claim 7 wherein the temperature is in the range of 315–425° C.

References Cited by the Examiner
UNITED STATES PATENTS 2,467,123  4/1949  Fleck et al.
3,029,296  4/1962  White et al. _____ 260—650

OTHER REFERENCES

Kovacic et al.: "J. Am. Chem. Soc.," vol. 82, pp. 1917–23 (1960).

LEON ZITVER, *Primary Examiner.*